United States Patent [19]

Frey et al.

[11] Patent Number: 5,333,086
[45] Date of Patent: Jul. 26, 1994

[54] THIN FILM TWO-POLE INDUCTIVE MAGNETIC HEAD WITH MINIMIZED SECONDARY PULSES

[75] Inventors: Karl A. Frey, Melrose; Michael Mallary, Berlin, both of Mass.

[73] Assignee: Digital Equipment Corporation, Maynard, Mass.

[21] Appl. No.: 38,330

[22] Filed: Mar. 29, 1993

Related U.S. Application Data

[60] Division of Ser. No. 988,370, Dec. 9, 1992, which is a continuation of Ser. No. 617,999, Nov. 26, 1990.

[51] Int. Cl.$^5$ .............................................. G11B 5/147
[52] U.S. Cl. ..................................... 360/126; 360/125
[58] Field of Search ....................... 360/126, 119–120, 360/125

[56] References Cited

U.S. PATENT DOCUMENTS

| | | |
|---|---|---|
| 4,130,846 | 12/1978 | Best . |
| 4,190,872 | 2/1980 | Jones et al. ........................ 360/125 |
| 4,644,322 | 2/1987 | Heim ................................. 360/123 |
| 4,876,790 | 10/1989 | Grimm et al. ..................... 360/126 |
| 4,878,290 | 11/1989 | Masud et al. ..................... 427/131 |
| 5,051,856 | 9/1991 | Narishige et al. ................. 360/126 |
| 5,181,152 | 1/1993 | Yan et al. .......................... 360/126 |
| 5,240,740 | 8/1993 | Frey et al. ......................... 427/130 |

OTHER PUBLICATIONS

IBM/TDB vol. 2, No. 1, Jun. 1959, pp. 42–43 "Magnetic Head" by Poch et al.

*Primary Examiner*—John H. Wolff
*Attorney, Agent, or Firm*—Albert P. Cefalo; Ronald C. Hudgens

[57] ABSTRACT

A thin film two-pole inductive magnetic head for a computer disk drive assembly. The head comprises a substrate, a first pole formed over the substrate, a gap layer formed over the first pole and a second pole formed over the gap layer. The first and second poles have their distal ends coupled together in a yoke region, while their proximal ends terminate at their tips in an air bearing surface. A leading surface of the first pole extends back toward the yoke region at an acute angle to the air bearing surface. The head reduces the amplitude and high frequency content of secondary pulses in a readback waveform so as to ease the task of electronically isolating the main pulses for downstream processing of the read data.

20 Claims, 4 Drawing Sheets

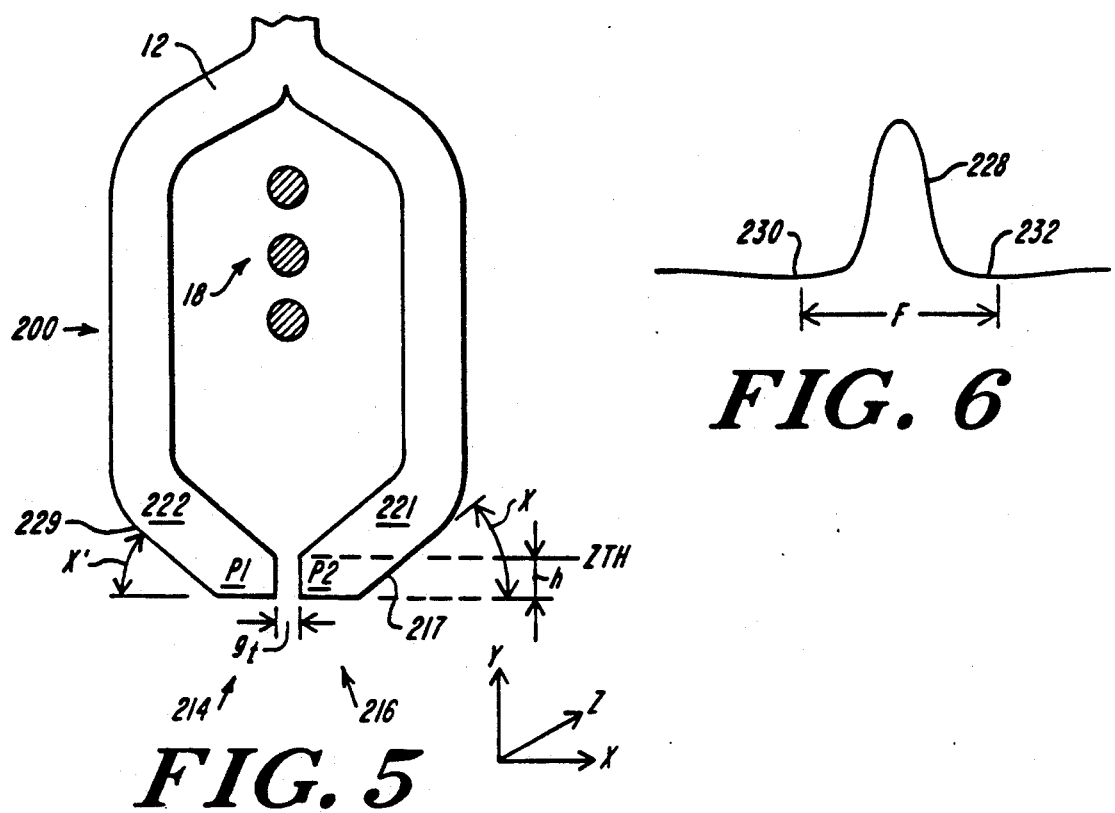
FIG. 5
FIG. 6
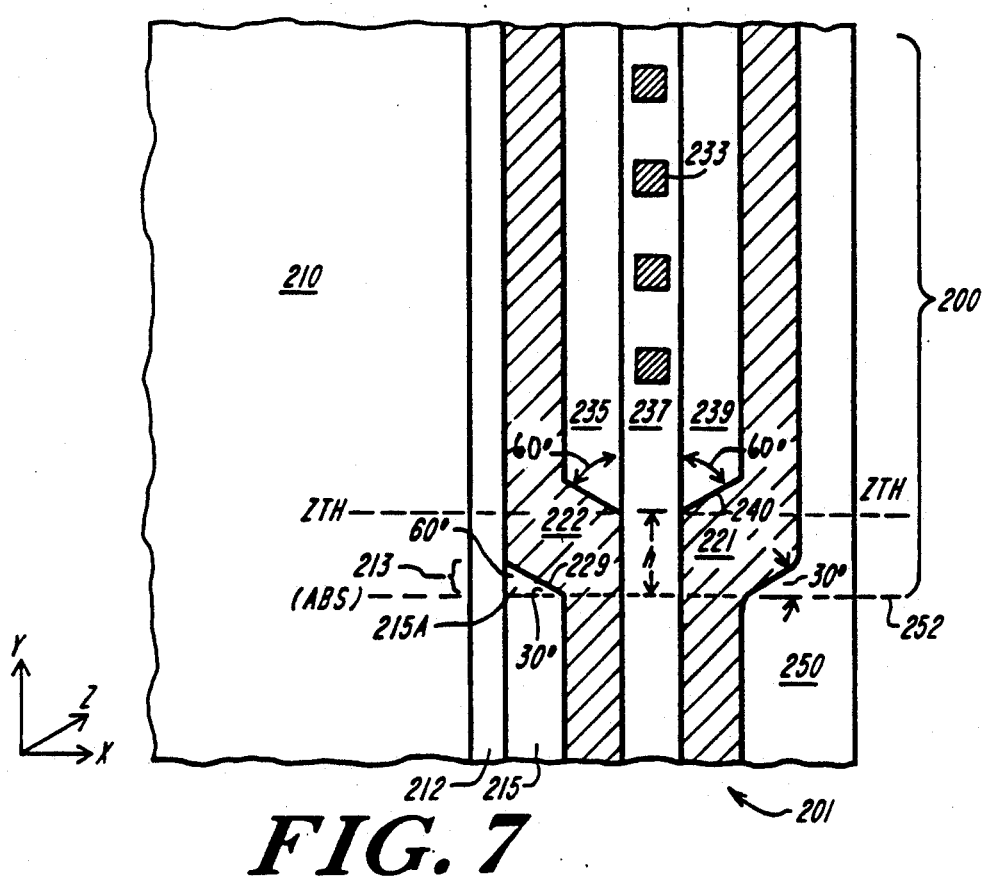
FIG. 7

THIN FILM TWO-POLE INDUCTIVE MAGNETIC HEAD WITH MINIMIZED SECONDARY PULSES

This is a divisional of copending application Ser. No. 07/988,370 filed on Dec. 9, 1992, which is a continuation of Ser. No. 07/617,999 filed on Nov. 26, 1990, now abandoned.

BACKGROUND OF THE INVENTION

The present invention relates to thin film recording heads, and more particularly to a thin film head with minimized secondary pulses.

Thin film magnetic recording heads are well-known for recording of digital data on a recording medium. A typical two-pole head 10 in a disk drive assembly 11A of computer 11, shown in FIG. 1, includes poles P1 and P2 extending along a longitudinal axis Y. Respective ends of these poles are coupled together to form yoke 12 at a distal end of head 10. At the proximal end of the head the poles terminate in respective pole tips 14, 16. The poles are formed separated by a gap g having a gap thickness $g_t$ (along the X-axis). The pole tips terminate in a polished air bearing surface (ABS) at the end of the gap. The head is typically formed with excess material at the pole tips, which are then carefully lapped back to establish the ABS at a desired throat height h.

The gap forms a pole throat T, having a height h extending along the head longitudinal axis between the parallel pole tip inside walls 15, 15'. Height h is measured from the point where walls 15, 15' no longer diverge called the zero throat height point (ZTH) to the ABS. The gap thickness $g_t$ is carefully controlled over the height h of the pole throat T for uniformity of magnetic response and optimized magnetic performance. The pole tips are generally rectangular from the ABS to the ZTH, and conventionally measure several microns in height.

The pole tips cooperate with medium 20 as it streams past the head in direction 22 tangent to or along the X-axis. The pole tips 14, 16 interact with the recording medium for writing data onto or reading data from the medium. The head has a width measured along the Z-axis which defines the head "footprint" (i.e., track width) on the medium.

For a portion or all of throat height h, the pole tips extend perpendicularly from the ABS toward yoke 12, during which both pole tips are essentially rectangular. Thereafter, while the P1 pole essentially continues extending generally perpendicularly back to the yoke, the P2 pole tip 16 begins to turn into ramp 21, at an acute takeoff angle A, and then a back portion 23 of the P2 pole ultimately couples the P2 pole into the yoke.

The magnetic head generates write fields which represent data sought to be stored in magnetic layer 20' of the medium as the medium is moving in direction 22 at a constant speed. The magnetic material layer includes magnetic dipoles which can be oriented in a given direction in tracks in response to the head's magnetic write field. A change or "transition" in dipole orientation represents a stored bit on the recording medium. The goal in making a head for high density recording is to obtain a very narrow gap thickness $g_t$ over the pole throat height h, because it is the narrowness of the gap which in large measure determines the size of the recorded bit (the number of dipoles transition to transition), and hence recording density.

Generally speaking, a read flux circuit, beginning with flux from the medium, runs through one of the pole tips through the yoke and returns to the medium via the other pole tip. In an inductive head, an inductive pickup coil 18 is provided to interact with the flux passing through yoke 12 in order to generate a readback voltage based on the flux rate of change in the read flux circuit. Ramp 21 opens up the head between the poles to facilitate formation of coil 18 around the yoke. Coil 18 is coupled to a downstream data qualification circuit 11B of computer 11 within which the data signal is extracted from the readback signal for conversion into useful information.

The two-pole head reads a transition in three steps, thus generating the readback signal 26 shown in FIG. 2. First, flux from an oncoming transition on the medium links into the leading edge 34 of pole tip 14 from which a leading secondary pulse 30 is generated. Next, as the transition continues to move past the head from the first pole tip, across the gap, to the leading edge 36 of the second pole tip 16, a main pulse 28 is generated. Now as the transition moves away from the head, its flux decouples from the trailing edge 38 of the second pole tip 16 and generates a trailing secondary pulse 32. Secondary pulses 30, 32 are typically of the same polarity, but of a polarity opposite to that of the main pulse 28, and while the main pulse is generally a high frequency signal, the secondary pulses have a lower frequency component. It is on these bases that the main and secondary pulses are distinguished by qualification circuit 11B.

Readback waveform 26 is read within a processing time frame F (measured in microseconds) by the data qualification circuit 11B, and a main pulse 28 is thereafter extracted from the readback waveform representative of a data bit. A plurality of data bits are retrieved by qualifying sequentially generated readback waveforms 26 in a sequence of spaced apart time frames.

The process of high density recording reduces the amplitude of the main pulse 26 generated from reading one of many closely spaced bits to approximately 50 percent of an isolated pulse. Furthermore, where bits are densely packed on a storage medium the trailing or leading secondary pulses from the neighboring bits overlap the main pulse, which further reduces the amplitude of the main pulse to about 30–36 percent of an isolated pulse (about 4–10 percent reduction caused by the leading pulse and about 10 percent reduction caused by the trailing pulse), and makes isolation of the main pulse a more difficult task for the qualification circuit 11B.

It is therefore an object of the present invention to provide a thin film recording head which minimizes secondary pulses in the readback waveform.

It is another object of the present invention to provide a thin film head which eases the task of the qualification circuitry by reducing the effect of secondary pulses in the readback signal.

SUMMARY OF THE INVENTION

The present invention provides a new inductive two-pole thin film head whose configuration reduces secondary pulses in the readback waveform so as to ease the task of the computer's qualification circuit in extracting a main pulse of interest from the readback signal. The invention takes advantage of the fact that gradually grading or ramping up (toward the gap) of the magnetic character of the first pole tip can lengthen the leading secondary pulse in the readback signal, and gradually grading or ramp up (toward the gap) of the magnetic character of the second pole tip can lengthen the trailing secondary pulse in the readback signal, thus reducing the secondary pulses within a readback window W. As a consequence of the foregoing, a main pulse of interest in a stream of readback pulses is less perturbed by and easier to distinguish from the secondary pulses neighboring and overlapping the main pulse of interest.

One aspect of the invention is to provide an integrating feature on an inductive head which acts essentially as a low frequency filter and which reduces the high frequency content of at least the leading secondary pulse (and preferably also the trailing secondary pulse) in the readback waveform for a given bit of a stream of data bits read from a medium. In a stream of read data, the lower frequency secondary pulses are more easily distinguished from the high frequency main pulses by the downstream data qualification hardware. As well, the above integrating feature increases the time over which the flux coupling process occurs and reduces the amplitude of the secondary pulses such that a portion of the secondary pulses will be excluded from the readback signal when it is processed. This further eases the task of the downstream qualification hardware. The integration feature includes a graded (i.e., magnetically ramped) pole tip configuration.

A head according to an embodiment of the invention includes an integration feature on the leading edge of the first pole and preferably an integration feature also on the trailing edge of the second pole, so as to obtain the above benefits relative to both the leading and the trailing secondary pulses in the readback waveform, and so as to achieve a symmetrical reduction of the secondary pulses in a readback waveform.

BRIEF DESCRIPTION OF THE DRAWINGS

These and other features and advantages of the present invention will be more fully understood by reference to the following detailed description in conjunction with the attached drawings in which like reference numerals refer to like elements and in which:

FIG. 5 shows a plan view of a two-pole head of the invention.

FIG. 6 shows a readback waveform (magnitude over time) generated by the head of FIG. 5.

FIG. 7 is a side cross-sectional view of part of a substrate on which a head has been formed in practice of the invention.

DETAILED DESCRIPTION OF PREFERRED EMBODIMENTS

Figure 2:
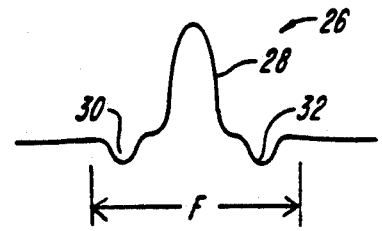
FIG. 2 shows a readback waveform (magnitude over time) generated by the head of FIG. 1.
Figure 3:
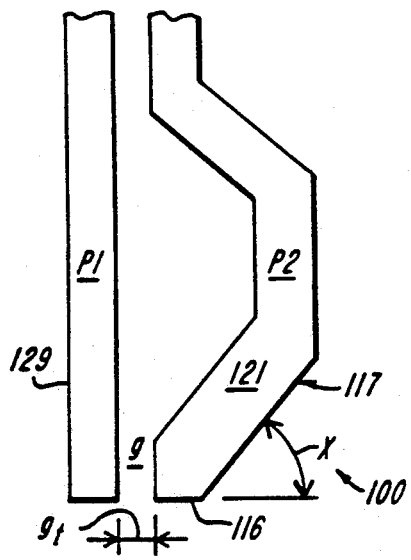
FIG. 3 is a partial view of a two-pole head of the invention.
Figure 4:
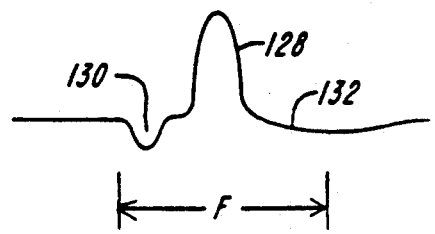
FIG. 4 shows a readback waveform (magnitude over time) generated by the head of FIG. 3.

The present invention is directed to reduction of the leading and trailing secondary pulses in a readback signal from a two-pole thin film head. As shown in FIG. 3, a ramp 121 of head 100 is formed extending down to the ABS. The trailing side 117 of the P2 pole adjacent its tip 116 is canted at an acute takeoff angle x from the ABS. The canted side 117 causes the trailing secondary pulse to spread out, lowering its amplitude and high frequency content within the system processing time frame F, as indicated by pulse 132 of FIG. 4. While the area of the curve of pulse 32 in FIG. 2 is equal to the area of the curve of pulse 132, as a lower frequency signal with lower amplitude within time frame F secondary pulse 132 is easier to isolate from a neighboring main pulse 128. Therefore the 10 percent reduction of a main pulse of interest caused by overlap with a trailing secondary pulse from a neighboring bit can be substantially reduced or eliminated, and thus the main pulse is more easily isolated out of the readback waveform.

The above innovation reduces the trailing secondary pulse by extending the P2 ramp to the ABS. This benefit is also sought for the P1 pole, and head 100 is therefore modified to obtain head 200 shown in FIG. 5. Since the P2 pole is the same in FIG. 5 as in FIG. 3, head 200 will create a similarly reduced trailing secondary pulse 232. Hence, the analysis as set forth above regarding the head 100 P2 pole tip and ramp 121 applies equally to the head 200 P2 pole tip and ramp 221. Furthermore, such analysis may be adapted to P1 pole tip 214 whose side 229 is canted at an acute takeoff angle x' from the ABS to generate a ramp 222. Thus the amplitude and high frequency content of the leading secondary pulse 230 of FIG. 6 can be reduced within time frame F (compare to pulse 130 of FIG. 4). Therefore the 10 percent reduction of a main pulse of interest caused by a trailing secondary pulse from a neighboring bit and the 10 percent reduction of the main pulse of interest caused by overlap with a leading secondary pulse from a neighboring bit can be substantially reduced or eliminated. Hence the task of isolating main pulses of interest from interfering secondary pulses is simplified. In addition, because of the symmetry of this head, the secondary pulses are symmetrical, which further eases the task of the qualification circuitry.

It will now be recognized that a structure which reduces the high frequency content of the leading or trailing secondary pulses acts as an integration device in the nature of an integration circuit which filters high frequency components from a varying signal. However, by performing such integration structurally, in the head, the discrimination task of qualification circuit 11B is greatly reduced. In short, in practice of the invention, when reading a data bit the effect of neighboring secondary pulses 30, 32 upon a main pulse 28 is minimized by physically spreading the secondary-pulse-generating edges of the poles over a larger area. This forces the time period of the secondary pulses to in part extend outside of processing time frame F, and thus both reduces the high frequency content and signal amplitude of the portion of the secondary pulses inside of the processing time frame. It will therefore be appreciated that in practice of the present invention the main pulse 28 of the readback waveform 26 can be isolated from the effects of secondary readback by diminishing neighboring secondary readback pulses 30, 32 in the manner set forth herein.

The penalty for introduction of acute takeoff angles x, x' from the ABS is an increase in process complexity during head manufacture. Nevertheless, in practice of the present invention, in the thin film head of FIG. 5, for example, having a throat height (measured along the y-axis) of one or a few microns, a pole width of approximately eight microns (measured along the Z-axis) and a pole thickness of approximately three microns (measured along the X-axis), about a 30 degree takeoff angle starting at the ABS for each ramp results in a reasonable trade-off between reduction of the secondary pulses and resulting process complexity.

In any event, in general practice of the invention, the head is lapped to form an ABS in close proximity (e.g., less than the gap thickness $g_t$) to the start of at least the P1 ramp (and also the P2 ramp in the embodiment of FIG. 5). However, lapping too far into the ramp should be avoided. Ideally the height h of the P1 pole is greater than g/2 from the ABS to the location where the gap begins to spread (i.e., at the ZTH plane).

Thin film heads incorporating the present invention may be formed in a variety of processes and in a variety of additional configurations. As for making of a head, a preferred process of forming head 200 is described with respect to the partial view of a workpiece 201 in FIG. 7. Initially, a non-magnetic seed layer 212 (such as TaAu) is formed on a substrate 210 (such as AlSiMag). A photoresist process is employed to form a non-magnetic layer (by plating through a window in the photoresist) forming layer 215 perhaps a few microns thick on the seed layer. Preferably the edge of layer 215, as developed, is at an angle of about 60 degrees to the substrate (according to the angle of illumination of the resist layer during its exposure and according to developing conditions). This forms a non-magnetic intermediate wedge 215A with a takeoff angle x' (see FIG. 5) of about 30 degrees.

The P1 pole layer (such as NiFe) is formed over this layered combination, with an inclined ramp 222 of the pole formed over the inclined wedge 215A of layer 215. Thereafter the coil windings 233 (such as Cu) in conjunction with insulation/gap layers, such as layers 235, 237, 239, are conventionally formed (perhaps of $Al_2O_3$). However, layer 239 is further formed with an edge 240 at an angle of about 60 degrees and the P2 pole (such as NiFe) is formed photolithographically thereover having an approximate 60 degree inclined ramp 221. A protective coat 250 (such as $Al_2O_3$) is applied over workpiece 201.

Figure 1:
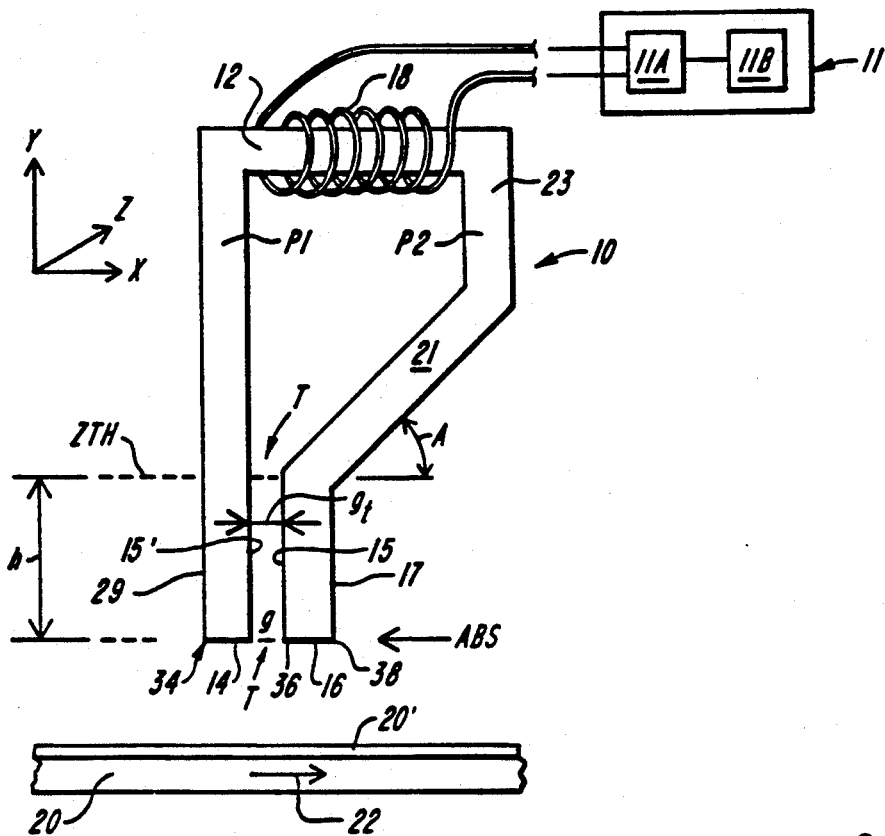
FIG. 1 is a side view of a prior art two-pole thin film head in a computer.

The head ultimately will be polished down to plane 252 (the ABS), thus forming the head of FIG. 5. Although after lapping there is no generally rectangular pole tip portion as in the prior art head of FIG. 1, (or perhaps there is up to about a ½ micron rectangular pole tip portion), still ample throat height h is obtained in the present invention by forming enlarged ramp portions 221, 222.

It is noted that while use of a magnetic seed layer is conventional in formation of a two-pole thin film inductive head, the above process requires use of a non-magnetic seed layer 212. This is so because portion 213 of the seed layer (under wedge 215A) will extend out to the air bearing surface of the finished head and will act as a third pole if the layer is magnetic. This would perturb the readback waveform.

Figure 8:
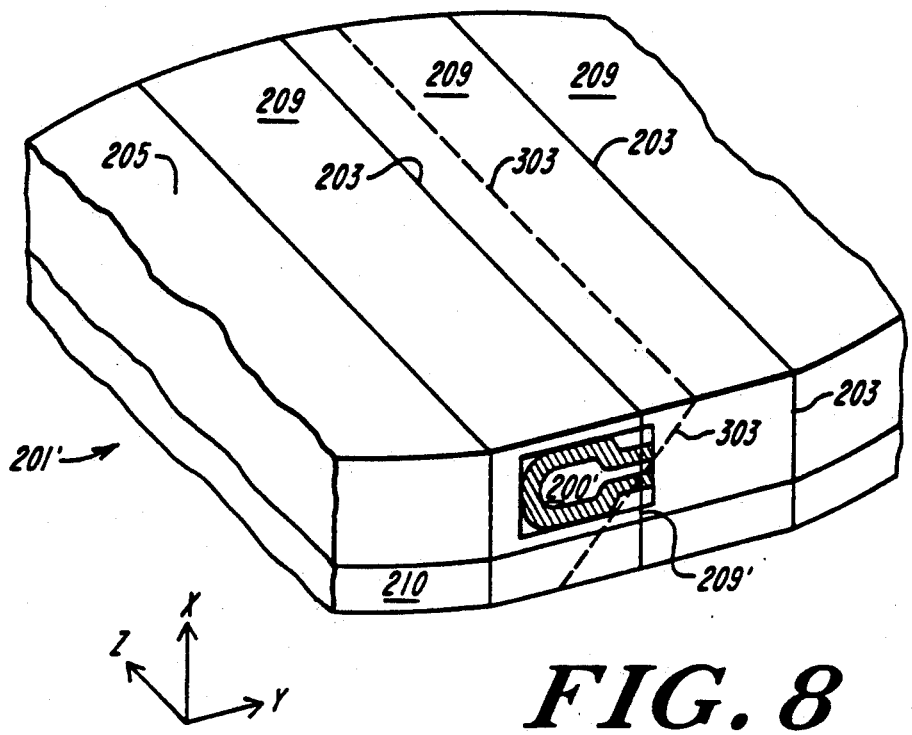
FIG. 8 is a side view of the workpiece of FIG. 7.

FIG. 8 is a side view of a portion 201' of a complete workpiece 201, and shows that after the head forming process a plurality of parallel cuts 203 are made in workpiece 201 perpendicular to the workpiece surface 205. These cuts will sever the workpiece into a plurality of bars 209, each comprising a plurality of heads. The face 209' of each bar 209 exposing the pole tips (e.g., see head 200') is lapped down to plane 252 (see FIG. 7) to form the air bearing surface at a desired throat height h. The bars are then sliced many times along the Z-axis parallel to the X-axis to sever the bar into a plurality of separate heads 200 (FIG. 5). The heads are then individually affixed to a respective carrier (called a flexure). Thereafter, leads are attached to this assembly. The heads are thus made ready for testing and use in a computer disk drive, with the benefits of the invention as set forth herein.

Several alternative embodiments are set forth below. Each preferably has the ramped P2 pole configuration shown in FIG. 3 and a particular leading secondary pulse reduction configuration on the P1 pole, so as to fully enjoy the benefits of the present invention.

Figure 9:
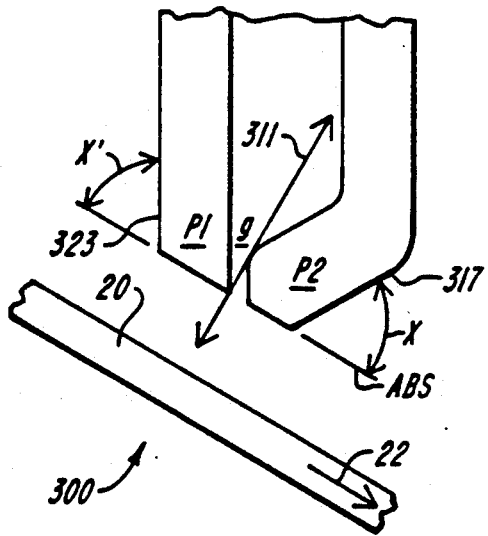
FIG. 9 is a partial view of a two-pole head of the invention.

In one alternative embodiment of the invention shown in FIG. 9, head 300 is formed essentially as in the head of FIG. 3, up to the point of cutting the substrate into bars. Here, however, rather than making a plurality of parallel perpendicular cuts 203 in the workpiece surface 205, a plurality of parallel cuts are made in the workpiece surface at an acute angle x' (see dotted line 303 in FIG. 8). The heads now obtain the configuration shown in FIG. 9, with P1 pole takeoff angle x' being formed by cut 303, and angle x being formed during plating of the P2 pole or by milling. Hence, the bars are then sliced to separate the individual heads with the ABS of each head at an acute angle x' to the leading side 323 of the straight P1 pole tip and at an acute angle x to the trailing side 317 of the ramped P2 pole tip, while the ABS remains perpendicular to the longitudinal axis 311 of the head. In FIG. 9, x and x' each are approximately 50–60 degrees; they are preferably equal and as close to 45 degrees as possible when following the above-described method. Thus the P1 and P2 pole tips enjoy the benefits of grading disclosed above.

Figure 10:
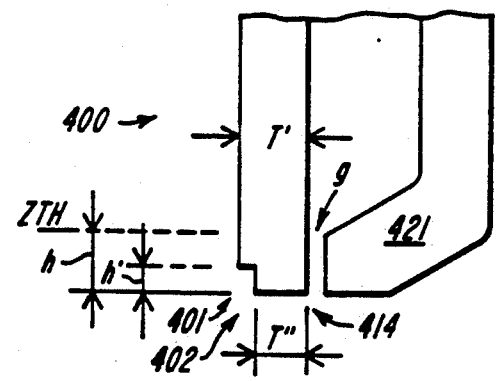
FIG. 10 is a partial view of a two-pole head of the invention.
Figure 10A:
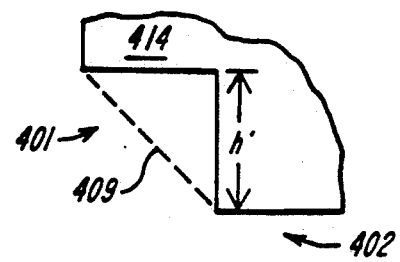
FIG. 10A is an inset of the notched portion of the P1 pole tip.

In another embodiment of the invention, shown in FIG. 10, head 400 is configured as in FIG. 3 except for a small right angle indented section 401 (see inset FIG. 10A) defined in the leading corner 402 of the P1 pole tip 414. P1 pole tip 414 has a nominal thickness T' and a thickness T'' at the ABS, where T'-T'' is the thickness of section 401, and h' is its height (perhaps about a quarter of a micron, compared to a throat height h of about 1–2 microns). Section 401 has the magnetic effect of an inclined ramp (see dotted line 409 in FIG. 10A) having the benefits as described above with respect to ramp 222 of FIG. 5 for reduction of the leading secondary pulse, while the P2 pole ramp 421 affords the benefits ascribed to ramp 221 of FIG. 5. Indented section 401 can be formed by configuring section 215 of FIG. 7 accordingly.

The ramping effect of the present invention may also be obtained by grading the magnetic characteristics of the material which forms the poles. For example, it is possible to form a plurality of layers, each of successively higher permeability material, for grading the magnetic coupling of the pole tips with the nearby transition. In embodiment 500 shown in FIG. 11A, the P1 pole is formed with at least two layers, including a lower permeability (in the range of 1.5 to 5) layer P1' at the leading side of the P1 pole and a higher permeability (on the order of 1000) layer P1" at the trailing (gap) side of the pole. The P2 pole is formed, for example, with at least two layers including a higher permeability layer P2" at the leading (gap) side of the P2 pole and a lower permeability layer P1' at the trailing side of the pole.

Figure 11B:
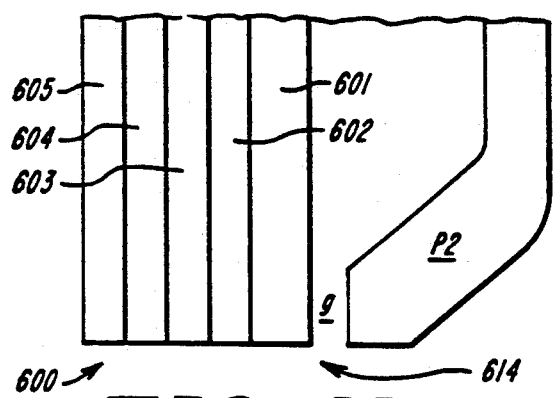
FIG. 11B is a partial view of a two-pole head of the invention.
Figure 11A:
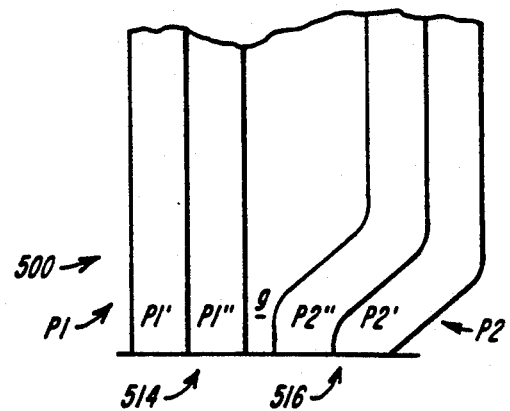
FIG. 11A is a partial view of a two-pole head of the invention.

Alternatively, the grading in the above embodiment might be obtained by provision of a laminated structure 600, shown in FIG. 11B, having a plurality of thin magnetic layers 602-605 of perhaps about a quarter of a micron or even about one micron thickness each formed under a NiFe P1 pole layer 601 perhaps 3 microns thick. The thin layers 602-605 have a limited magnetic capacity (for example, having a permeability of about 5, 3.5, 2.5 and 1.5, respectively), while pole layer 601 is generally configured like pole P1 of FIG. 3 (for example, having a permeability of 500-2000). As for a comparison of the embodiment of FIG. 11B with that of FIG. 11A, layer 601 is analogous to layer P1" and layers 602-605 collectively are analogous to layer P1'. The configurations of FIGS. 11A, 11B thus have in general a similar integration effect as do the inclined ramps 221, 222 in the configuration of FIG. 5. The graded effect achieved by the configuration in FIG. 11B can also be obtained by providing alternating layers 602-605 of magnetic and non-magnetic material in order to simulate a low, graded average permeability.

Figure 12A:
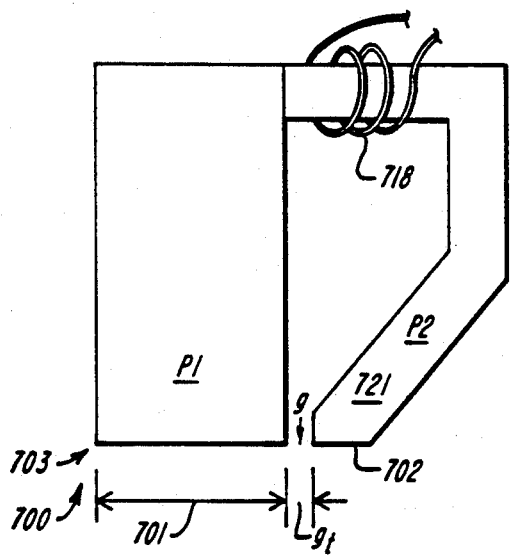
FIG. 12A is a partial view of a two-pole head of the invention.

In yet another head embodiment 700, shown in FIG. 12A, the P1 pole is made magnetically large, relative to P2. The P1 pole may be formed as a thick magnetic layer 701 on a magnetic seed layer on an insulating wafer (or perhaps as a thin pole layer on a conductive ferrite substrate). The flux from the oncoming transition entering the leading edge 703 of this pole is so far removed from the gap that the flux only gradually couples into this pole. The size of the secondary pulse from the leading side of the P1 pole is inversely proportional to the $\frac{2}{3}$ power of the pole's thickness. Therefore increasing the pole thickness reduces the secondary pulse associated with it. (Also, if the P1 pole is formed on a ferrite substrate, then the flux in the P1 pole will not leak to the coil and will not produce a secondary pulse.) As shown, the P2 ramp 721 is analogous to ramp 221 of FIG. 5.

Figure 12B:
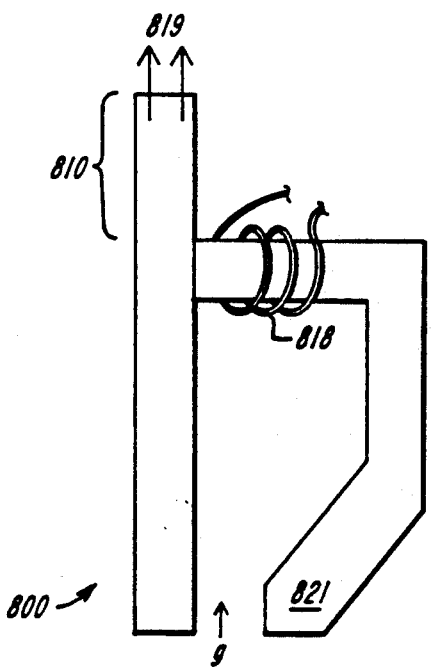
FIG. 12B is a partial view of a two-pole head of the invention.

In embodiment 800 of FIG. 12B the length of the P1 pole is extended with a tail 810 so that a portion 819 of the flux entering the P1 pole will be emitted from the tail, bypassing coil 818. In this embodiment, ramp 821 functions like ramp 221 of FIG. 5.

The configurations of FIGS. 12A, 12B, or any combination thereof, will substantially reduce the magnitude of the leading secondary pulse, and although the trailing pulse will be increased in magnitude, the ramped P2 configuration will reduce the trailing pulse adequately. As a result of reduction of the effect of the secondary pulses, pole thickness becomes less critical, as long as the poles have sufficient area to pass the necessary flux from and to the recording medium and the throat height is controlled to optimize the readback signal and overwrite capability.

It will be appreciated that the actual value of acute ramp angles x, x' while stated above as possibly 30 degrees, will be selected according to the data recovery requirements of the target system.

It should now be appreciated that the secondary pulse reducing configurations discussed above are considered to be a means of integrating (meaning: averaging, filtering, or reducing) the effect of the unwanted high frequency aspect of the leading and trailing secondary pulses so that now the task of qualification of main pulses out of many closely spaced readback signals will be greatly simplified. Furthermore, it will be understood that the above description pertains to only several embodiments of the present invention. That is, the description is provided by way of illustration and not by way of limitation. The invention, therefore, is to be defined according to the following claims.

What is claimed is:

1. A thin film two-pole inductive magnetic head, comprising:
   a substrate;
   a first pole formed over the substrate;
   a gap layer formed over the first pole; and
   a second pole formed over the gap layer, the first and second poles being formed such that distal ends thereof are coupled together in a yoke region, proximal ends thereof terminate at their tips in an air bearing surface, the pole tips have parallel facing internal surface defining therebetween a magnetic gap and a throat running from the air bearing surface toward the yoke region having a throat height, and a leading surface of the first pole extends back toward the yoke region at an acute angle to the air bearing surface.

2. The head of claim 1 further comprising a layer of non-magnetic material on the substrate with the first pole formed on the non-magnetic layer and the acute angle between the leading surface of the first pole and the air bearing surface is defined by a non-magnetic wedge on the non-magnetic layer.

3. The head of claim 2 wherein the first pole tip leading surface begins at the air bearing surface.

4. The head of claim 2 wherein the first pole tip leading surface begins at or within ½ micron of the air bearing surface.

5. The head of claim 2 wherein a trailing surface of the second pole extends back toward the yoke region at an acute angle for reducing the high frequency component of a secondary pulse in the readback signal associated with the second pole.

6. The head of claim 5 wherein the second pole tip trailing surface begins at the air bearing surface.

7. The head of claim 5 wherein the first pole tip leading surface and the second pole tip trailing surface begins at or within ½ micron of the air bearing surface.

8. The head of claim 5 wherein at least one of the acute angles is about 30 degrees relative to the air bearing surface.

9. The head of claim 1 wherein the trailing edge of the second pole extends back toward the yoke region at an acute angle to the air bearing surface.

10. The head of claim 9 wherein the angles are each about 30 degrees.

11. The head of claim 9 wherein the angles are each about 45 degrees.

12. A thin film two-pole inductive magnetic head, comprising:
   a substrate;
   a first pole formed over the substrate;
   a gap layer formed over the first pole; and
   a second pole formed over the gap layer, the first and second poles being formed such that distal ends thereof are coupled together in a yoke region, proximal ends thereof terminate at their tips in an air bearing surface, the pole tips have parallel facing internal surface defining therebetween a magnetic gap and a throat running from the air bearing surface toward the yoke region having a throat height, and there is a small indended section at the leading edge of the tip of the first pole at the air bearing surface.

13. A thin film two-pole inductive magnetic head, comprising;
    a substrate;
    a first pole formed over the substrate;
    a gap layer formed over the first pole; and
    a second pole formed over the gap layer, the first and second poles being formed such that distal ends thereof are coupled together in a yoke region, proximal ends thereof terminate at their tips in an air bearing surface, the pole tips have parallel facing internal surface defining therebetween a magnetic gap and a throat running from the air bearing surface toward the yoke region having a throat height, and a tail portion of the first pole extends away from the air bearing surface beyond the yoke region.

14. A thin film two-pole inductive magnetic head, comprising:
    a substrate;
    a first pole formed over the substrate consisting of layers of magnetic material of successively higher permeability;
    a gap layer formed over the first pole; and
    a second pole formed over the gap layer, the first and second poles being formed such that distal ends thereof are coupled together in a yoke region, proximal ends thereof terminate at their tips in an air bearing surface, and the pole tips have parallel facing internal surfaces defining therebetween a magnetic gap of thickness $g_t$ and a throat running from the air bearing surface toward the yoke region having a throat height greater than $g_t/2$.

15. The head of claim 14 wherein the number of layers constituting the first pole is two.

16. The head of claim 15 wherein the permeability of one of the layers is in the range of 1.5 to 5 and the permeability of the other of the layers is about 1000.

17. The head of claim 14 wherein the number of layers constituting the first pole is 5.

18. The head of claim 17 wherein permeabilities of the layers are 1.5, 2.5, 3.5, 5, and about 1000.

19. A thin film two-pole inductive magnetic head, comprising:
    a substrate;
    a first pole formed over the substrate consisting of alternating layers of magnetic and non-magnetic material, the uppermost layer being a high-permeability magnetic layer;
    a gap layer formed over the first pole; and
    a second pole formed over the gap layer, the first and second poles being formed such that distal ends thereof are coupled together in a yoke region, proximal ends thereof terminate at their tips in an air bearing surface, and the pole tips have parallel facing internal surfaces defining therebetween a magnetic gap of thickness $g_t$ and a throat running from the air bearing surface toward the yoke region having a throat height greater than $g_t/2$.

20. A thin film two-pole inductive magnetic head, comprising:
    a substrate;
    a first pole formed over the substrate;
    a gap layer formed over the first pole; and
    a second pole formed over the gap layer, the first and second poles being formed such that distal ends thereof are coupled together in a yoke region, proximal ends thereof terminate at their tips in an air bearing surface, the pole tips have parallel facing internal surfaces defining therebetween a magnetic gap and a throat running from the air bearing surface toward the yoke region having a throat height, and said first pole is formed as a thick magnetic layer relative to said second pole.

* * * * *